US007502345B2

(12) United States Patent
Aaltonen

(10) Patent No.: US 7,502,345 B2
(45) Date of Patent: Mar. 10, 2009

(54) TRANSMITTING MESSAGES IN TELECOMMUNICATION SYSTEM COMPRISING A PACKET RADIO NETWORK

(75) Inventor: Janne U. Aaltonen, Tampere (FI)

(73) Assignee: Nokia Corporation, Espoo (FI)

( * ) Notice: Subject to any disclaimer, the term of this patent is extended or adjusted under 35 U.S.C. 154(b) by 863 days.

(21) Appl. No.: 10/037,272

(22) Filed: Nov. 9, 2001

(65) Prior Publication Data

US 2002/0110116 A1    Aug. 15, 2002

(30) Foreign Application Priority Data

Nov. 17, 2000    (FI) .................................. 20002531

(51) Int. Cl.
*H04Q 7/00* (2006.01)
(52) U.S. Cl. ...................................... 370/331; 370/352
(58) Field of Classification Search ......... 370/352–356, 370/400–401, 216–227, 252, 331
See application file for complete search history.

(56) References Cited

U.S. PATENT DOCUMENTS

| 5,729,534 | A |   | 3/1998 | Jokinen et al. |
| 5,732,078 | A | * | 3/1998 | Arango ........................ 370/355 |
| 5,790,534 | A |   | 8/1998 | Kokko et al. |
| 5,818,833 | A |   | 10/1998 | Maruyama |
| 5,978,368 | A |   | 11/1999 | Hjelm et al. |
| 6,011,978 | A |   | 1/2000 | Ault et al. |
| 6,081,510 | A | * | 6/2000 | Valentine .................... 370/252 |
| 6,321,096 | B2 | * | 11/2001 | Lautenschlager et al. ... 455/461 |
| 6,370,390 | B1 | * | 4/2002 | Salin et al. .................. 455/466 |
| 6,678,524 | B1 | * | 1/2004 | Hansson et al. ............. 455/445 |
| 6,721,565 | B1 | * | 4/2004 | Ejzak et al. ................. 455/436 |
| 6,940,846 | B1 | * | 9/2005 | Frey et al. ................... 370/352 |
| 6,944,150 | B1 | * | 9/2005 | McConnell et al. ......... 370/352 |
| 2003/0039237 | A1 | * | 2/2003 | Forslow ...................... 370/352 |

FOREIGN PATENT DOCUMENTS

| DE | 198 56 440 A1 | 6/2000 |
| EP | WO 98/44640 | 10/1998 |

(Continued)

OTHER PUBLICATIONS

The proposal of wireless multimedia communication system with integration of packet-switched and circuit-switched channels. Ono, T.; Tanaka, T.; Global Telecommunications Conference, 1998. IEEE, vol. 1, Nov. 8-12, 1998 pp. 120-125 vol. 1.*

(Continued)

*Primary Examiner*—Firmin Backer
*Assistant Examiner*—Christine Ng
(74) *Attorney, Agent, or Firm*—Perman & Green, LLP

(57) ABSTRACT

A method of transmitting messages in a telecommunication system comprising a first network offering circuit-switched services, a second network offering packet-switched services, and at least one mobile station supporting the first and the second network. When the need arises to transmit at least one message, a check is made to see if the mobile station is attached to the second network. The message is transmitted to the second network if the mobile station is attached to the second network. The message is transmitted to the first network in case of failure to transmit the message via the second net-work.

28 Claims, 2 Drawing Sheets

FOREIGN PATENT DOCUMENTS

| | | |
|---|---|---|
| EP | WO 00/35214 | 6/2000 |
| JP | 10-163957 | 6/1998 |
| JP | 11-205574 | 7/1999 |
| JP | 2 000 209 633 | 7/2000 |
| JP | 2 000 511 754 | 9/2000 |
| JP | 2000-278761 | 10/2000 |
| JP | 2001-508971 | 7/2001 |
| JP | 2 002 532 981 | 10/2002 |
| WO | WO 98/27698 | 6/1998 |
| WO | WO 98/32303 | 7/1998 |
| WO | 98/44640 A2 | 10/1998 |
| WO | 98/48587 A1 | 10/1998 |
| WO | WO 98/47269 | 10/1998 |
| WO | 99/16266 A1 | 4/1999 |
| WO | 99/17475 A1 | 4/1999 |
| WO | 99/33301 A1 | 7/1999 |
| WO | WO 01/24565 A1 | 4/2001 |
| WO | WO 01/65881 A | 9/2001 |

OTHER PUBLICATIONS

"The GSM System For Mobile Communications", Mouly et al., 1992.

English Translation of Patent Abstract JP 10-163957.

English Translation of Patent Abstract JP 11-205574.

English Translation of Patent Abstract JP 2000-278761.

European Telecommunications Standards Institute, "ETSI EN 301 344 V7.3.1 (Jul. 2000); Digital cellular telecommunications system (Phase 2+); General Packet Radio Service (GPRS); Service description; Stage 2 (GSM 03.60 version 7.3.1 Release 1998)." Jul. 2000.

European Telecommunications Standards Institute, "ETSI TS 100 901 V7.4.0 (Dec. 1999); Digital cellular telecommunications system (Phase 2+); Technical realization of the Short Message Service (SMS) (GSM 03.40 version 7.4.0 Release 1998)." Dec. 1999.

European Telecommunications Standards Institute, "ETSI TS 100 942 V7.0.0 (Aug. 1999); Digital cellular telecommunications system (Phase 2+); Point-to-Point (PP) Short Message Service (SMS) support on mobile radio interface (GSM 04.11 version 7.0.0 Release 1998)." Aug. 1999.

European Telecommunications Standards Institute, "ETSI TS 101 113 V7.5.0 (Jul. 2000); Digital cellular telecommunications system (Phase 2+); General Packet Radio Service (GPRS); Service description; Stage 1 (GSM 02.60 version 7.5.0 Release 1998)." Jul. 2000.

European Telecommunications Standards Institute, "ETSI TS 100 940 V7.8.0 (Oct. 2000); Digital cellular telecommunications system (Phase 2+); Mobile radio interface layer 3 specification (GSM 04.08 version 7.8.0 Release 1998)." Oct. 2000.

European Telecommunications Standards Institute, "ETSI TR 101 748 V7.0.0 (Aug. 1999); Digital cellular telecommunications system (Phase 2+); Abbreviations and acronyms (GSM 01.04 version 7.0.0 Release 1998)." Aug. 1999.

European Telecommunications Standards Institute, "TDoc SMG3 GPRS 97G139." Apr. 1997.

3RD Generation Partnership Project, "3G TS 23.040 V3.5.0 (Jul. 2000); Technical Specification; 3rd Generation Partnership Project; Technical Specification Group Terminals; Technical realization of the Short Message Service (SMS); (Release 1999)" Jul. 2000.

3RD Generation Partnership Project, "3GPP TS 24.011 V3.4.0 (Sep. 2000); Technical Specification; 3rd Generation Partnership Project; Technical Specification Group Core Network; Point-to-Point (PP) Short Message Service (SMS) support on mobile radio interface (Release 1999)." Sep. 2000.

Narayan, S., "GSM Point-to-Point Message Service." Telecommunications, May-Jun. 2000, pp. 14-22.

* cited by examiner ure not updated to support a short message from the GPRS network, the transmission of short messages fails from the MS via the GPRS network.

TRANSMITTING MESSAGES IN TELECOMMUNICATION SYSTEM COMPRISING A PACKET RADIO NETWORK

BACKGROUND OF THE INVENTION

The invention relates to transmitting messages in a telecommunication system comprising a packet radio network.

In the GSM system, short message services SMS have turned out to be extremely popular. Short messages are used for text-based messaging between users or to convey application data, such as WAP (Wireless Application Protocol) application data. Short messages are relayed by a short message service center (SM-SC), which forwards short messages and stores and retransmits messages that have not been delivered. The SM-SC is able to receive a short message via any network for delivery to a mobile station MS. The SM-SC transfers a short message received to a gateway mobile switching center for short message service (SMS-GMSC) to be delivered further to a mobile station. A mobile-originating short message is relayed via an interworking mobile switching center for short message service (SMS-IWMSC) to the SM-SC to be delivered further. Signalling channels may be utilized in transmitting and receiving short messages; hence no separate traffic channel is required.

Short message services have turned out to be necessary also for the general packet radio service (GPRS) developed for the GSM system. The GPRS comprises serving GPRS support nodes (SGSN) and gateway GPRS support nodes (GGSN). The GGSN acts as a gateway to packet data networks (PDN), such as the Internet, i.e. from the point of view of an outside network PDN the GGSN acts as a router to a subnetwork. The SGSN serves mobile stations MS attached thereto in its service area, transmits and receives data packets from said mobile stations and monitors the location of mobile stations within its service area. The attachment of an MS to a SGSN refers to the formation of a mobility management context for the MS, this function being called GPRS Attach in the GPRS system. In order for the short message service to be able to be utilized via a GPRS network, an interface Gd is standardized between the SGSN and the SMS-GMSC and the SGSN and the SMS-IWMSC. An MS attached to a GPRS network is able to transmit and receive short messages through the GPRS network via the interface Gd. An active PDP (Packet Data Protocol) context is not needed for transmission and reception of a short message, and so short messages are transmitted in a GPRS network using the signalling of the GPRS network. In a GPRS network, signalling is based on the use of GPRS traffic channels.

However, the problem is that the interface Gd is not obligatory in GPRS networks, and so the GPRS network does not have to support the transmission of short messages. If an interface Gs exists between the SGSN and a mobile switching center (MSC/VLR), a mobile-terminated short message can be relayed from the MSC/VLR to the SGSN and further to the MS. The GPRS standard defines that a GPRS-attached but non-IMSI attached mobile station has to transmit short messages via GPRS channels. This causes problems since the MS does not know if the GPRS network supports the transmission of mobile-originated short messages via the GPRS network. If no Gd interface exists or the interfaces of the SMS-IWMSC

BRIEF DESCRIPTION OF THE INVENTION

The object of the invention is to provide a method and an apparatus implementing the method so as to avoid the above problems. The objects of the invention are achieved with a method and a mobile station characterized by what is stated in the independent claims. The preferred embodiments of the invention are disclosed in the dependent claims.

The invention is based on the mobile station transmitting messages via a first network offering circuit-switched services if message transmission failed via a second network offering packet-switched services.

The method and system of the invention provide the advantage that the transmission of messages intended to be transmitted to a packet-switched network can also be arranged in systems not supporting short message transmission via a packet-switched network. Owing to the solution, no changes are needed in networks, but, instead, the mobile station attends to the transmission to a circuit-switched network.

In accordance with a preferred embodiment of the invention, a mobile station transmits messages via a first network offering circuit-switched services if the mobile station is not attached to a second network offering packet-switched services. Message transmission to the first network can be made automatic, whereby messages can be sent without error messages and user intervention. The aim to always send messages via a second packet-switched network typically results in more efficient use of network resources. In accordance with a preferred embodiment of the invention, the first network is a GSM network and the second network a GPRS network. Message transmission via a GSM network typically requires suspension of the GPRS network service. The aim to always send messages via a GPRS network avoids the break in data transmission caused by the suspension and the signalling that consumes radio resources.

BRIEF DESCRIPTION OF THE FIGURES

In the following, the invention will be described in greater detail in connection with preferred embodiments with reference to the accompanying drawings, in which.

DETAILED DESCRIPTION OF THE INVENTION

The invention is applicable to any wireless telecommunication system in which a mobile station is able to transmit messages via a packet-switched network and a circuit-switched network. In the following, short message transmission according to a preferred embodiment of the invention is described in the GSM/GPRS system.

Figure 1:
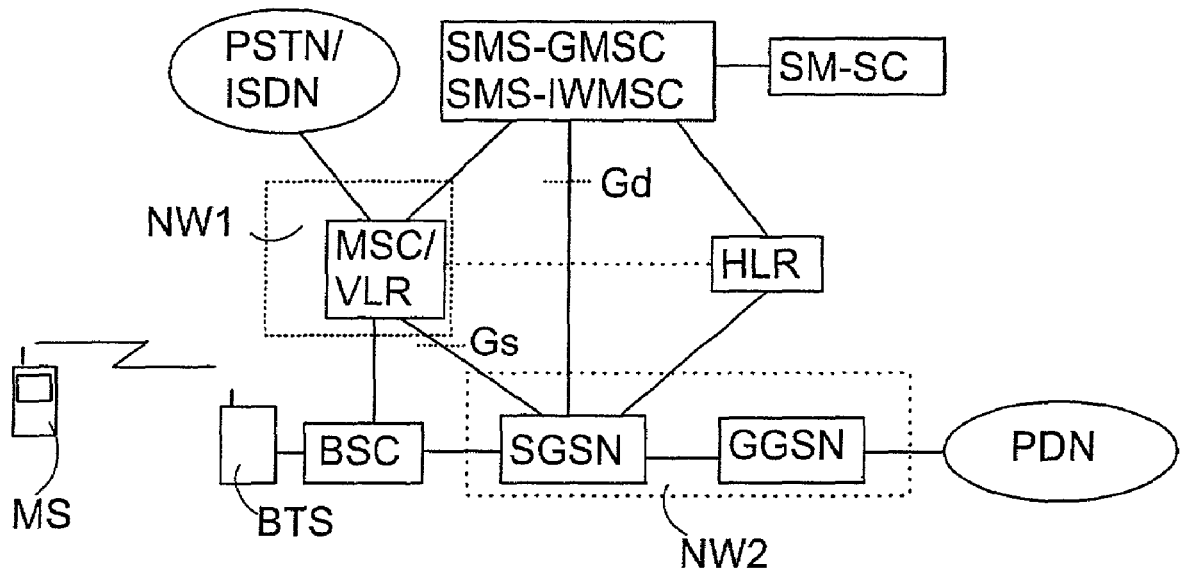
FIG. 1 shows a GSM/GPRS system supporting short message services.

FIG. 1 illustrates a wireless telecommunication system, in which a first network NW1 is a GSM network offering circuit-switched services and a second network NW2 is a GPRS network offering packet-switched services. Circuit-switched services of the GSM network to other networks PSTN (Public Switched Telephony Network) and ISDN (Integrated Services Digital Network) are offered by a mobile switching center MSC/VLR that attends to connection set-up and routing calls to the right addresses. Two databases comprising information on mobile subscribers are used as assistance herein: a home location register (HLR) comprising information on all subscribers of a mobile network and the services ordered by them, and a visitor location register (VLR) comprising information on mobile stations visiting the area of a given mobile switching center MSC/VLR. A more detailed description of the GSM system and short message transmission in a GSM network is given in the ETSI/GSM specifications and in 'The GSM system for Mobile Communications', M. Mouly and M. Pautet, France 1992, ISBN:2-957190-07-7.

As was described above, the GPRS network NW2 comprises one or more operating nodes SGSN and gateway nodes GGSN. Both the circuit-switched GSM network (MSC/VLR) and the packet-switched GPRS network (SGSN, GGSN) utilize the same base station system (BSS). The BSS comprises base transceiver stations (BTS) communicating with mobile stations (MS) over the radio path, and base station controllers (BSC) controlling the radio frequencies and channels available to the base stations BTS coupled thereto. The MSC/VLR and SGSN are both also able to use the HLR, the SMS-IWMSC that relays short messages, and the SMS-GMSC. The SMS-IWMSC and SMS-GMSC are coupled to a short message center (SM-SC) attending to the storage and forwarding of short messages.

Figure 2:
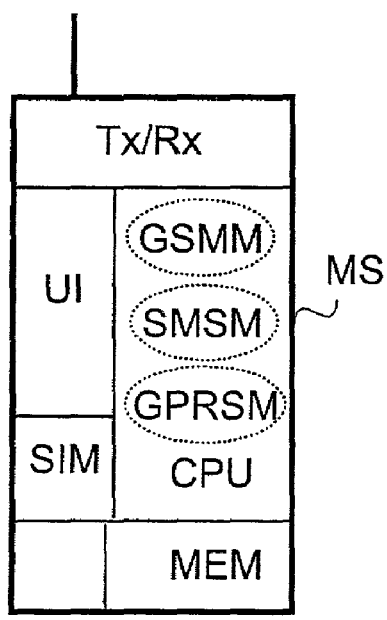
FIG. 2 illustrates the structure of a mobile station according to a preferred embodiment of the invention.

FIG. 2 illustrates the structure of a mobile station MS according to a preferred embodiment of the invention. The MS comprises a transceiver (Tx/Rx) that communicates via an antenna with the BTS. User interface (UI) means typically comprise a display, a keyboard, a microphone and a speaker. An MS also comprises a subscriber identity module (SIM) in which short messages, for example, can be stored. The MS comprises a memory (MEM) in which a code can be stored for execution by a central processing unit (CPU). The CPU uses the MEM, the Tx/Rx, the SIM and the UI to implement GSM means (GSMM) offering the GSM service, short message means (SMSM) offering transmission and reception of short messages, and GPRS means (GPRSM) offering the GPRS service. The GSMM, SMSM and GPRSM can be implemented by software by means of existing processors and memory; integrated circuits may also be used.

Figure 3:
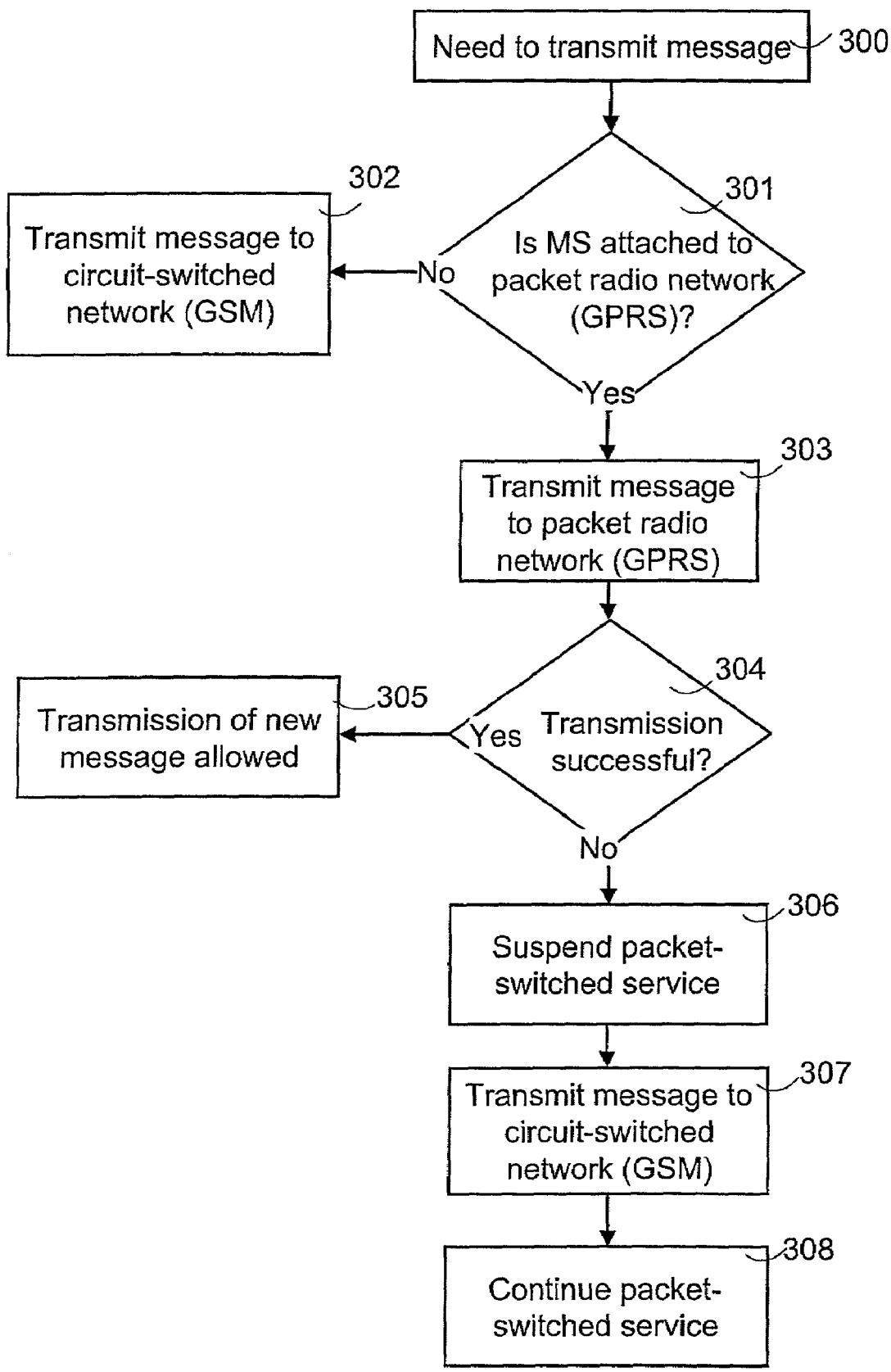
FIG. 3 is a flow diagram of the operation of a mobile station in short message transmission according to a preferred embodiment of the invention.

FIG. 3 illustrates the transmission of short messages according to a preferred embodiment of the invention. The need 300 to transmit a short message arises when the user of an MS has keyed in a short message and activated its transmission, or when data arrives for transmission as a short message from an MS application, such as the WAP. A chat application, smart messaging and the SIM Application Toolkit, for example, may also utilize short messages. In response to the need 300, a check 301 is made to see if the MS is attached to a packet radio network GPRS. This may be implemented by the SMSM checking from the GPRSM the state (MM State) of one or more current mobility management contexts (MM Context) of the MS. If at least one MM context is in READY or STANDBY state, the MS is attached to a GPRS network. If the MS is not attached to a GPRS network, the SMSM are arranged to use the GSMM to transmit 302 the message to the GSM network offering circuit-switched services. If the MS is attached to a GPRS network, the SMSM are arranged to use the GPRSM to transmit 303 the message to the GPRS network offering packet-switched services.

The SMSM are arranged to check 304 if short message transmission was successful. If so, the SMSM are ready to transmit 305 a new short message. Short message transmission may have failed for example because the SGSN or SMS-IWMSC does not support the interface Gd; in which case an error message is returned to the MS. If short message transmission failed, the SMSM and GPRSM are arranged to suspend 306 the packet-switched GPRS service (GPRS Suspension) from the GPRS network. The SMSM are arranged to use the GSMM to transmit 307 the short message to a GSM network. Once the short message (or several short messages) is transmitted, the offering of the packet-switched GPRS service may continue 308.

Suspension of GPRS Services 306 is needed at least for class B mobile stations. The suspension 306 may be arranged such that the SMSM request suspension of the service from the GPRSM when an error message is received and the intention is to transmit a short message as GSM signalling via the MSC/VLR of the GSM network. The MS transmits a suspension message (RR Suspend) to the BSC. The BSC may terminate GPRS traffic to the temporary logical link identity (TLLI) of the MS. The BSC transmits the suspension message to the SGSN, and the SGSN transmits an acknowledgement message (Suspend Ack).

When the BSC determines that the MS no longer requires circuit-switched resources, it transmits a resumption request (Resume) to the SGSN. The SGSN transmits an acknowledgement (Resume Ack) to the resumption request. The BSC transmits a radio channel release request (RR Channel Release) to the MS, on the basis of which the radio channels possibly used by the MS are released. The MS may then transmit and receive data via the GPRS network (308). If the resumption request (Resume) or the radio channel release request (RR Channel Release) fails, the MS may continue the GPRS service by transmitting a routing area update request to the SGSN.

In accordance with a preferred embodiment of the invention, the user of an MS is offered the option to choose whether messages are transmitted via a GSM network or a GPRS network. The UI may display a menu, for example, allowing the user to carry out either of the settings:

a) short messages are always transmitted via a GSM network, or b) the process is in accordance with FIG. 3, i.e. the attempt is to transmit short messages via a GPRS network. The SMSM transmit the messages as selected by the user. The process is in accordance with FIG. 3 at least when the intention is to transmit a short message via the GPRS network; however, it is possible to try to transmit short messages intended to be transmitted via a GSM network to a GPRS network.

The message to be transmitted does not have to be a short message of the short message service SMS. The invention is applicable to any message service, such as transmissions of picture messages or messages containing multimedia information. Message transmission according to the invention is also applicable to other systems than the GSM/GPRS, for example to third generation telecommunication systems, such as the UMTS (Universal Mobile Telecommunications System) based on the core network of the GSM system and standardized by the 3GPP (Third Generation Partnership Project), or the third generation system standardized by the 3GPP2. Besides the short message service, a multimedia-messaging service is being developed for the UMTS.

It is apparent to a person skilled in the art that, as technology advances, the basic idea of the invention may be implemented in various ways. The invention and its embodiments are thus not restricted to the above examples, but may vary within the scope of the claims.

What is claimed is:

1. A method of transmitting text-based messages, the method comprising:
   checking, by a mobile station, in response to the need to transmit at least one text-based message from the mobile station in a telecommunication system, which telecommunication system comprises a first network offering circuit-switched services and a second network offering packet-switched services, if the mobile station is attached to the second network, attachment of the mobile station to the second network referring to formation of a mobility management context for the mobile station,
   transmitting said at least one text-based message to the second network in response to the mobile station being attached to the second network, and
   in response to failure to transmit the at least one text-based message via the second network if an error message is received from the second network, transmitting said at least one text-based message to the first network.

2. A method as claimed in claim 1, wherein said message is transmitted via the first network in response to non-attachment to the second network.

3. A method as claimed in claim 1, further comprising the steps of:
   suspending packet-switched service in the second network before transmitting said message to the first network, and
   continuing offering the packet-switched service after transmission of said message at the request of the first network or the mobile station.

4. A method as claimed in claim 1, wherein
   the first network is a GSM network and the second network is a GPRS network.

5. A method as claimed in claim 4, wherein said message is a text-based short message of a short message service SMS or a picture message.

6. A method as claimed in claim 1, wherein
   the user of the mobile station is offered the option to choose whether the messages are transmitted via the first network or the second network, and
   the messages are transmitted in accordance with the user's choice.

7. A method as claimed in claim 1, wherein, in said step of transmitting said at least one message to the second network, said at least one message is transmitted via a short message service (SMS) form of transmission.

8. A method as claimed in claim 1, wherein the second network is a GPRS network and said message is a text-based short message of a short message service SMS, and said at least one message is transmitted to the first network offering circuit-switched services in response to a failure in the SMS transmission via the GPRS network if the error message is received in the mobile station.

9. A method as claimed in claim 1, wherein said mobile station is attached to the second network via a support node.

10. A mobile station configured to transmit a text-based message, and to
    check, with respect to transmission of a text-based message via either a first network offering circuit-switched services or via a second network offering packet-switched services, and in response to the need to transmit at least one text-based message, if the mobile station is attached to the second network, attachment of the mobile station to the second network referring to formation of a mobility management context for the mobile station,
    transmit said at least one text-based message to the second network in response to the mobile station being attached to the second network, and
    in response to failure to transmit the at least one text-based message via the second network if an error message is received from the second network, transmit said at least one text-based message to the first network.

11. A mobile station as claimed in claim 10, wherein
    the mobile station is configured to transmit said message via the first network in response to non-attachment to the second network.

12. A mobile station as claimed in claim 10, wherein
    the mobile station's user interface (UI) is configured to display a menu offering the user of the mobile station the option to choose whether messages are transmitted via the first network or the second network, and
    the mobile station is configured to transmit the messages in accordance with the user's choice.

13. A mobile station as claimed in claim 10, wherein
    the first network is a GSM network, the second network is a GPRS network, and said message is a text-based short message of a short message service SMS.

14. A mobile station as claimed in claim 10, wherein the mobile station is operative to transmit said at least one message to the second network via a short message service (SMS) form of transmission.

15. A mobile station as claimed in claim 10, wherein the second network is a GPRS network and said message is a text-based short message of a short message service SMS, and the mobile station is configured to transmit said at least one message to the first network offering circuit-switched services in response to a failure in the SMS transmission via the GPRS network if the error message is received in the mobile station.

16. A wireless device for transmitting a text-based message, the wireless device comprising:
    a processing unit and a memory for storing code for execution by the processing unit, the wireless device being capable of transmitting the text-based message via a first network or via a second network,
    the processing unit being configurable by the code to check, in response to a need to transmit at least one text-based message, if the wireless device is attached to the second network, attachment of the mobile station to the second network referring to formation of a mobility management context for the mobile station,
    the processing unit being configurable by the code to transmit said at least one text-based message to the second network in response to the wireless device being attached to the second network, and
    in response to failure to transmit the at least one text-based message via the second network if an error message is received from the second network, the processing unit being configurable by the code to transmit said at least one text-based message to the first network.

17. A method of transmitting short text-based messages from a mobile station, the method comprising:
    checking, by the mobile station, in response to a need to transmit at least one short text-based message, if the mobile station is attached to a second network, attachment of the mobile station to the second network referring to formation of a mobility management context for the mobile station, wherein the mobile station is in a telecommunication system comprising a first network offering circuit-switched services, and said second network which offers packet-switched services,
    transmitting said at least one short text-based message to the second network in response to the mobile station being attached to the second network, and
    in response to failure to transmit the text-based message via the second network if an error message is received from the second network, transmitting said at least one short text-based message to the first network.

18. A mobile station configured to transmit a short text-based message, and to:
   check, with respect to transmission of a short text-base message via either a first network offering circuit-switched services or via a second network offering packet-switched services, and in response to a need to transmit at least one short text-based message, if the mobile station is attached to the second network, attachment of the mobile station to the second network referring to formation of a mobility management context for the mobile station,
   transmit said at least one short text-based message to the second network in response to the mobile station being attached to the second network, and
   in response to failure to transmit the text-based message via the second network if an error message is received from the second network, transmit said at least one short text-based message to the first network.

19. A mobile station comprising:
   means for transmitting a short text-based message via a first network offering circuit-switched services,
   means for transmitting a short text-based message via a second network offering packet-switched services,
   means for checking, by the mobile station, in response to a need to transmit at least one short text-based message, if the mobile station is attached to the second network, attachment of the mobile station to the second network referring to formation of a mobility management context for the mobile station,
   means for transmitting said at least one short text-based message to the second network in response to the mobile station being attached to the second network, and
   means for transmitting said at least one short text-based message to the first network in response to a failure to transmit the at least one short text-based message via the second network if an error message is received from the second network.

20. A wireless device operative with a first network and a second network, the wireless device comprising:
   means for checking, in response to a need to transmit at least one text-based message, if the wireless device is attached to the second network, attachment of the mobile station to the second network referring to formation of a mobility management context for the mobile station,
   means for transmitting said at least one text-based message to the second network in response to an attachment of the wireless device to the second network, and
   means for transmitting said at least one text-based message to the first network in response to a failure to transmit the at least one text-based message via the second network if an error message is received from the second network.

21. An apparatus for transmitting text-based messages in a telecommunication system, and being operative to:
   check, in response to the need to transmit at least one text-based message, if an attachment exists to a second network, wherein the telecommunication system has a first network offering circuit-switched services and said second network which offers packet-switched services, attachment of the mobile station to the second network referring to formation of a mobility management context for the mobile station,
   transmit said at least one text-based message via the second network in response to there existing the attachment to the second network, and
   in response to failure to transmit the at least one text-based message via the second network if an error message is received from the second network, transmit said at least one text-based message via the first network.

22. An apparatus as claimed in claim 21, wherein said at least one message is a short text-based message of a short message service.

23. A storage medium for storing a computer program, the computer program comprising code to configure an apparatus to:
   check, in response to the need to transmit at least one text-based message, if a mobile station is attached to a second network, wherein the computer program is executable in a processor of said apparatus, said apparatus being operative for transmitting text-based messages in a telecommunication system that has a first network offering circuit-switched services and has said second network which offers packet-switched services, attachment of the mobile station to the second network referring to formation of a mobility management context for the mobile station,
   transmit said at least one text-based message via the second network in response to the mobile station being attached to the second network; and
   in response to failure to transmit the text-based message via the second network upon receipt of an error message from the second network, transmit said at least one text-based message to the first network.

24. A storage medium as claimed in claim 23, wherein the computer program comprises code for arranging transmission of short text-based messages of a short message service.

25. An apparatus for transmitting text-based messages, the apparatus comprising:
   means for checking, with respect to a mobile station in a telecommunication system having a first network offering circuit-switched services and a second network offering packet-switched services, and in response to a need to transmit at least one text-based message, if an attachment exists from the mobile station to the second network, attachment of the mobile station to the second network referring to formation of a mobility management context for the mobile station,
   means for directing transmission of said at least one text-based message via the second network in response to the existence of the attachment to the second network, and
   wherein said transmission directing means, in response to a failure to transmit the at least one text-based message via the second network upon receipt of an error message from the second network, directs the transmission of said at least one text-based message via the first network.

26. An integrated circuit, configured to:
   transmit at least one message to a second network in response to an apparatus being attached to the second network, the second network offering packet-switched services, wherein the integrated circuit is able to check, in response to the need to transmit at least one message, if the apparatus is attached to the second network, attachment of the mobile station to the second network referring to formation of a mobility management context for the mobile station, and
   transmit said at least one message to a first network offering circuit-switched services in response to failure to transmit the message via the second network if an error message is received from the second network.

27. An integrated circuit as claimed in claim 26, wherein the circuit is for a mobile station for communicating with a general packet radio service network.

28. An integrated circuit as claimed in claim 26, wherein said message is a short message of a short message service.

* * * * *